United States Patent Office 2,862,001
Patented Nov. 25, 1958

2,862,001

PROCESS FOR THE MANUFACTURE OF AN ISOXAZOLIDONE COMPOUND

Hans Kirchensteiner and Hans Spiegelberg, Basel, Switzerland, assignors to Hoffmann-La Roche Inc., Nutley, N. J., a corporation of New Jersey No Drawing. Application July 13, 1956
Serial No. 597,569

Claims priority, application Switzerland July 22, 1955

8 Claims. (Cl. 260—307)

The present invention relates to a novel process for the manufacture of a known isoxazolidone compound. The comprehensive process comprises acylating $\alpha$-amino-$\beta$-chloro-propionic acid at the amino group with a halogenated acetic acid, converting the $\alpha$-halogenacetamino-$\beta$-chloro-propionic acid obtained by means of a halogenation agent into the acid halide, reacting the latter with hydroxylamine to obtain the corresponding hydroxamic acid, cyclizing the same with the aid of a weakly basic agent to halogenacetamino-isoxazolidone and subsequently saponifying by alkali.

In the first reaction step, the amino group of $\alpha$-amino-$\beta$-chloro-propionic acid is provided with the acyl radical of a halogenated acetic acid, such as for instance chloracetic acid, trichloracetic acid, dibromacetic acid, bromacetic acid, fluoracetic acid, difluoracetic or, preferably, trifluoracetic acid. The acetylation reaction is advantageously effected by mixing the $\alpha$-amino-$\beta$-chloro-propionic acid with the anhydride of the corresponding halogenated acetic acid without using a solvent, whereupon the mixture is heated for a short while. In the second reaction step, the $\alpha$-halogenacetamino-$\beta$-chloro-propionic acid is treated with a halogenation agent, suitably with phosphorus pentachloride in acetyl chloride or ether. The reaction of the acid halide formed with hydroxylamine to the corresponding hydroxamic acid is advantageously effected in water or in an organic solvent, such as, for instance, ether, dioxane etc. For the purpose of purification the hydroxamic acid formed may be converted into its copper salt. After isolation and purification the acid may again be freed from the latter by means of hydrogen sulfide or dilute sulfuric acid. In order to cyclize the $\alpha$-halogenacetamino-$\beta$-chloro-propionhydroxamic acid to isoxazolidone, the hydroxamic acid is treated with weakly basic agents; a particularly favourable embodiment of the invention is the use of an aqueous alkali bicarbonate solution at temperatures between 20 and 50° C. The 4-($\alpha$-halogenacetamino)-3-isoxazolidone formed by cyclization need not be isolated, but can be saponified by alkali in the cyclization solution in order to split off the halogenacetyl radical. For this purpose, dilute aqueous solutions of alkalihydroxides or ammonia are particularly suitable. For instance, dilute ammonia is added to the cyclization solution and allowed to stand for a while at room temperature. The 4-amino-3-isoxazolidone thus obtained is very easily soluble in water. For isolation and purification purposes, the saponification solution is suitably passed through a cationic exchanger column, whereby the 4-amino-3-isoxazolidone is retained in the column. The column is subsequently eluted with a weakly aqueous ammonia solution and the 4-amino-3-isoxazolidone is precipitated from the eluate by means of a water-miscible organic solvent in which the 4-amino-3-isoxazolidone is only weakly soluble, for instance, alcohol.

For the above described reaction the racemic $\alpha$-amino-$\beta$-chloro-propionic acid as well as its optical antipodes may be used as starting material.

*Example*

10 g. of $\alpha$-amino-$\beta$-chloro-propionic acid are added in small portions, while shaking, to 24 g. of ice-cooled trifluoracetic anhydride, whereupon nearly complete dissolution takes place. The solution is further heated for 10 minutes to 60° C. and the volatile parts are then evaporated in the vacuum of a water jet pump. After dissolving in ether, the residue is filtered off, whereby a small part of the starting material is recovered. When evaporating the filtrate, a viscous oil is obtained. After addition of a little benzene and subsequent cooling, the oil crystallizes after some hours. Upon recrystallization from benzene-petroleum ether, the $\alpha$-trifluoracetamino-$\beta$-chloro-propionic acid melts at 68–70° C.

12.4 g. of $\alpha$-trifluoracetamino-$\beta$-chloro-propionic acid are dissolved in 120 cc. of dry ether and cooled to 0° C. 12.5 g. of phosphorus pentachloride are added in one portion and the mixture is shaken for 2 hours at room temperature. The small portion of resinous components is then quickly filtered off and the solution is completely evaporated at room temperature in the vacuum of a water jet pump. There is obtained as residue a viscous oil which solidifies in crystalline form after prolonged standing in a refrigerator. The $\alpha$-trifluoracetamino-$\beta$-chloro-propionic acid chloride thus obtained is used for the next step without further purification.

11.7 g. of the abovementioned crude acid chloride are dissolved in 150 cc. of dry acetone and cooled down to 0° C. A solution of 3 g. of hydroxylamine dissolved in 50 cc. of dioxane is slowly added, while stirring, and after 30 minutes the precipitated hydroxylamine hydrochloride is sucked off. The filtrate is evaporated in the vacuum of a water jet pump and shaken with 100 cc. of water, whereby the largest part dissolves. The resinous parts are filtered off and an excess of copper acetate solution is added to the aqueous solution, whereby the copper salt of the hydroxamic acid separates off. After centrifuging and decanting, the salt formed is dissolved in 200 cc. of alcohol and then a strong stream of hydrogen sulfide is conducted through the alcoholic solution. After addition of 5 g. of animal charcoal, the solid parts are filtered off and the solution is evaporated in the vacuum of a water jet pump at about 40° C. There remains a viscous, almost colourless syrup ($\alpha$-trifluoracetamino-$\beta$-chloro-propionhydroxamic acid) which shows a strong red colouring with ferric chloride.

1.5 g. of the $\alpha$-trifluoracetamino-$\beta$-chloro-propionhydroxamic acid are dissolved in 10 cc. of saturated sodium bicarbonate solution and heated to 40–50° C. for 10 minutes. 30 cc. of 1 $n$ ammonia are then added. The solution is allowed to stand for 15 hours at room temperature, concentrated in the vacuum of a water jet pump at 40° C. to a volume of about 10 cc. and passed through a cation exchanger column (Amberlite IR 120). The 4-amino-3-isoxazolidone formed is eluted with 0.2 $n$ ammonia solution, and the ammonia solution is concentrated to a volume of about 10 cc. in the vacuum of a water jet pump at a maximum temperature of 50° C. A little animal charcoal is added, the mixture is filtered, alcohol is added and the solution is concentrated in vacuo at a maximum temperature of 40° C., whereby flakes separate. The solution is again filtered and, after further addition of alcohol, concentrated in vacuo, whereby the 4-amino-3-isoxazolidone is separated in the form of felted needles. Melting point 141–143° C.

We claim:

1. $\alpha$-Halogenacetamino-$\beta$-chloro-propionic acid halide.
2. $\alpha$-Trifluoracetamino-$\beta$-chloro-propionic acid chloride.
3. $\alpha$ - Halogenacetamino-$\beta$-chloro - propionhydroxamic acid.

4. α-Trifluoracetamino-β-chloro-propionhydroxamic acid.

5. A process for the production of 4-amino-3-isoxazolidone which comprises acylating α-amino-β-chloro-propionic acid on the amino group by reacting with a halogenated acetic acid, converting the α-halogenacetamino-β-chloro-propionic acid obtained to the corresponding acid halide by treatment with a halogenating agent, producing α-halogenacetamino-β-chloro-propionhydroxamic acid by reacting the acid halide with hydroxylamine, cyclizing said hydroxamic acid by treatment with a weakly basic agent to obtain 4-(α-halogenacetamino)-3-isoxazolidone and treating the last named material with alkali to produce 4-amino-3-isoxazolidone.

6. A process which comprises acylating α-amino-β-chloro-propionic acid with trifluoracetic anhydride to obtain α-trifluoracetamino-β-chloro-propionic acid, halogenating the last named compound with phosphorus pentachloride to obtain α-trifluoracetamino-β-chloro-propionic acid chloride, treating said last named compound with hydroxylamine, cyclizing the α-trifluoracetamino-β-chloro-propionhydroxamic acid thus obtained with aqueous alkali bicarbonate and treating with ammonia the 4-(α-trifluoracetamino)-3-isoxazolidone obtained to produce 4-amino-3-isoxazolidone.

7. A process which comprises cyclizing α-halogenacetamino-β-chloro-propionhydroxamic acid by means of a weakly basic agent to produce 4-(α-halogenacetamino-3-isoxazolidone.

8. A process which comprises cyclizing α-trifluoracetamino-β-chloro-propionhydroxamic acid with aqueous alkali bicarbonate solution.

References Cited in the file of this patent

UNITED STATES PATENTS

| | | |
|---|---|---|
| 2,762,815 | Pohland | Sept. 11, 1956 |
| 2,772,281 | Holly et al. | Nov. 27, 1956 |
| 2,794,022 | Runge | May 28, 1957 |
| 2,803,649 | Hodge | Aug. 20, 1957 |
| 2,815,348 | Runge | Dec. 3, 1957 |

OTHER REFERENCES

Fischer et al.: Beilstein (Handbuch, 4th ed.), vol. 4, pages 383, 385, 395, 401 (1922).

Hanson et al.: Chem. Abstracts, vol. 43, column 1448 (1949).

Rothstein: Chem. Abstracts, vol. 44, column 1414 (1950).

Kuehl et al.: J. Am. Chem. Soc., vol. 77, pages 2344–47 (1955).